United States Patent [19]
Hokari

[11] Patent Number: 5,289,536
[45] Date of Patent: Feb. 22, 1994

[54] LEAST COST ROUTING METHOD ACCORDING TO INFORMATION TRANSFER CAPABILITY OF CUSTOMER PREMISES EQUIPMENT

[75] Inventor: Makoto Hokari, Tokyo, Japan
[73] Assignee: NEC Corporation, Tokyo, Japan
[21] Appl. No.: 854,852
[22] Filed: Mar. 20, 1992
[30] Foreign Application Priority Data
Mar. 20, 1991 [JP] Japan ................... 3-81758
[51] Int. Cl.$^5$ ................. H04M 7/00; H04J 3/12; H04Q 3/76
[52] U.S. Cl. .................... 379/221; 370/110.1; 379/94; 379/115
[58] Field of Search ........... 370/62, 79, 110.1; 379/94, 112-115, 220, 221

[56] References Cited

U.S. PATENT DOCUMENTS 4,791,665 12/1988 Bogart et al. ............ 379/221 X

FOREIGN PATENT DOCUMENTS 3-108862 5/1991 Japan ..................... 379/94
4-044446 2/1992 Japan ..................... 379/220
4-200057 7/1992 Japan ..................... 379/221

Primary Examiner—James L. Dwyer
Assistant Examiner—Harry S. Hong
Attorney, Agent, or Firm—Sughrue, Mion, Zinn, Macpeak & Seas

[57] ABSTRACT

ISDN subscriber line interface circuits of a switching system serve customer premises equipment of different information transfer capabilities. Least cost routing data and corresponding digit conversion data are stored in a memory, with the routing data indicating least cost outgoing routes through an ISDN network. These data are retrieved from the memory according to the called party number and information transfer capability field of a call setup message received from a calling party. The called party number is then converted according to the retrieved digit conversion data, and an ISDN trunk circuit is selected according to the retrieved least cost routing data. A connection is established between the originating ISDN SLIC and the selected ISDN trunk circuit, and the converted called party number is transmitted through a signaling channel to the ISDN network.

3 Claims, 3 Drawing Sheets

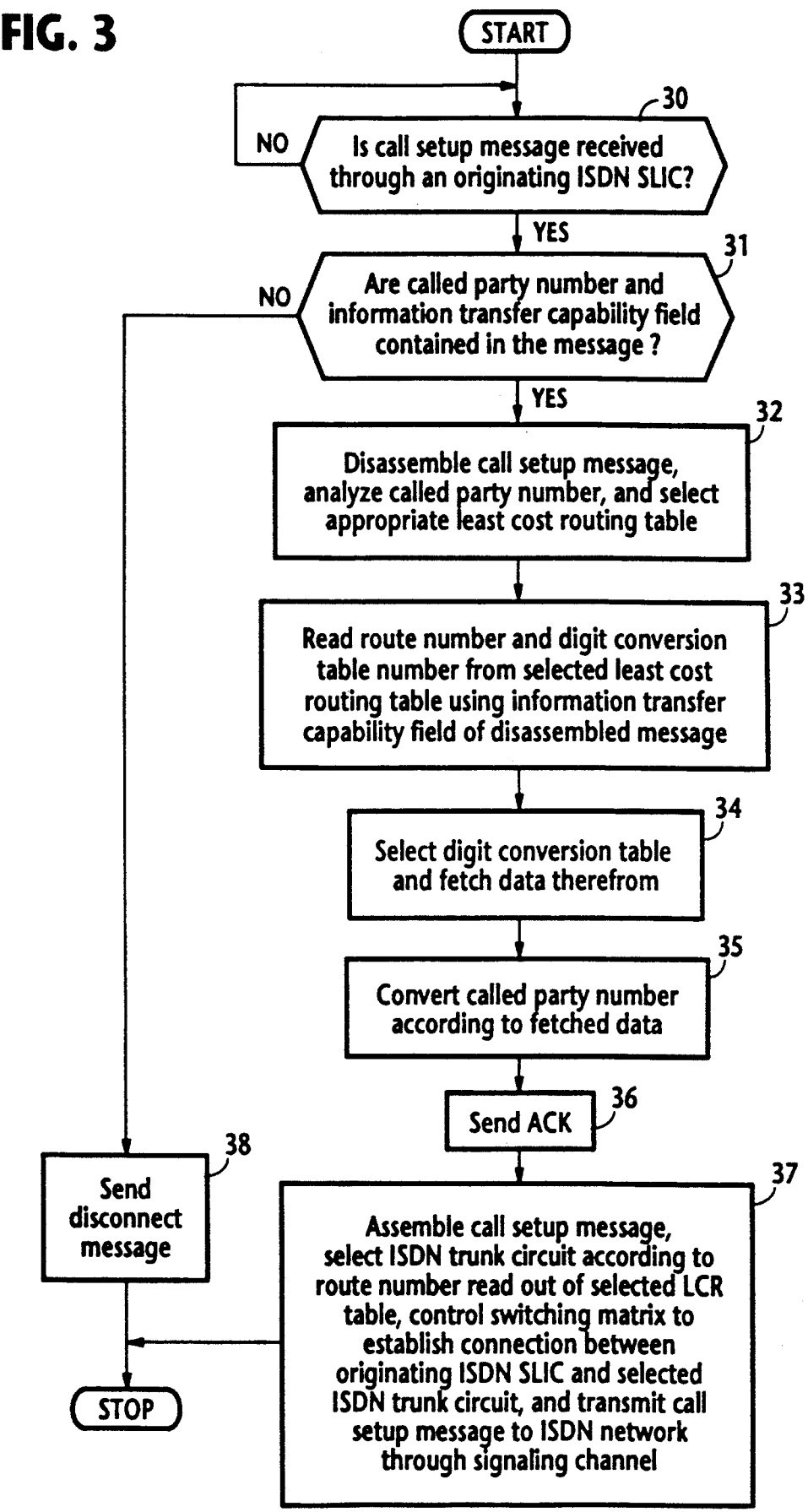

LEAST COST ROUTING METHOD ACCORDING TO INFORMATION TRANSFER CAPABILITY OF CUSTOMER PREMISES EQUIPMENT

BACKGROUND OF THE INVENTION

The present invention relates generally to telephone switching systems, and more particularly to a least cost routing technique for outgoing calls through an ISDN (integrated Services Digital Network) network.

According to conventional least cost routing schemes available for ISDN switching systems, digit conversion data and least cost route numbers are stored in a memory. In response to receipt of a call setup message from a calling party, the called party number contained in the message is used as an address pointer to retrieve digit conversion data and a least-cost route number from the memory. The header portion of the called party number is converted according to the retrieved digit conversion data and a least cost route is established through a public switched ISDN network according to the retrieved route number. Different types of customer premises equipment can be connected through an ISDN interface standardized by a CCITT Recommendation to a single subscriber loop. The type of such equipment is identified by a 5-bit information transfer capability identifier contained in the call setup message. However, the current switching system makes no distinction between different information transfer capabilities when determining a least cost route. Therefore, it is impossible to treat outgoing calls according to their information transfer capabilities when one wishes to take advantage of least cost routing only from voice traffic, while preventing other traffic such as facsimile and data from using this feature.

SUMMARY OF THE INVENTION

It is therefore an object of the present invention to provide a switching system capable of making a distinction between customer premises equipment of different information transfer capabilities when establishing a least cost route through an ISDN network.

According to the present invention, switched connections are established between ISDN subscriber line interface circuits and ISDN trunk circuits connected to an ISDN network. Each ISDN subscriber line interface circuit is capable of serving customer premises equipment (CPE) of different information transfer capabilities, and each of the CPE transmits a call setup message including a called party number and an information transfer capability field identifying the CPE when originating a call. In a main memory are stored least cost routing data indicating least cost outgoing routes through the ISDN network and digit conversion data corresponding to the least cost outgoing routes. A central processor receives a call setup message from an originating CPE through one of the ISDN subscriber line interface circuits, and retrieves least cost routing data and digit conversion data from the main memory according to the called party number and information transfer capability field contained in the received call setup message. The called party number is then converted according to the retrieved digit conversion data, and one of the ISDN trunk circuits is selected according to the retrieved least cost routing data. A connection is established between the originating ISDN subscriber line interface circuit and the selected ISDN trunk circuit, and the converted called party number is transmitted through a signaling channel to the ISDN network.

BRIEF DESCRIPTION OF THE DRAWINGS

The present invention will be described in further detail with reference to the accompanying drawings, in which:

FIG. 3 is a flowchart describing the programmed steps of instructions performed by the central processor of FIG. 1 during a call setup phase.

DETAILED DESCRIPTION

Figure 1:
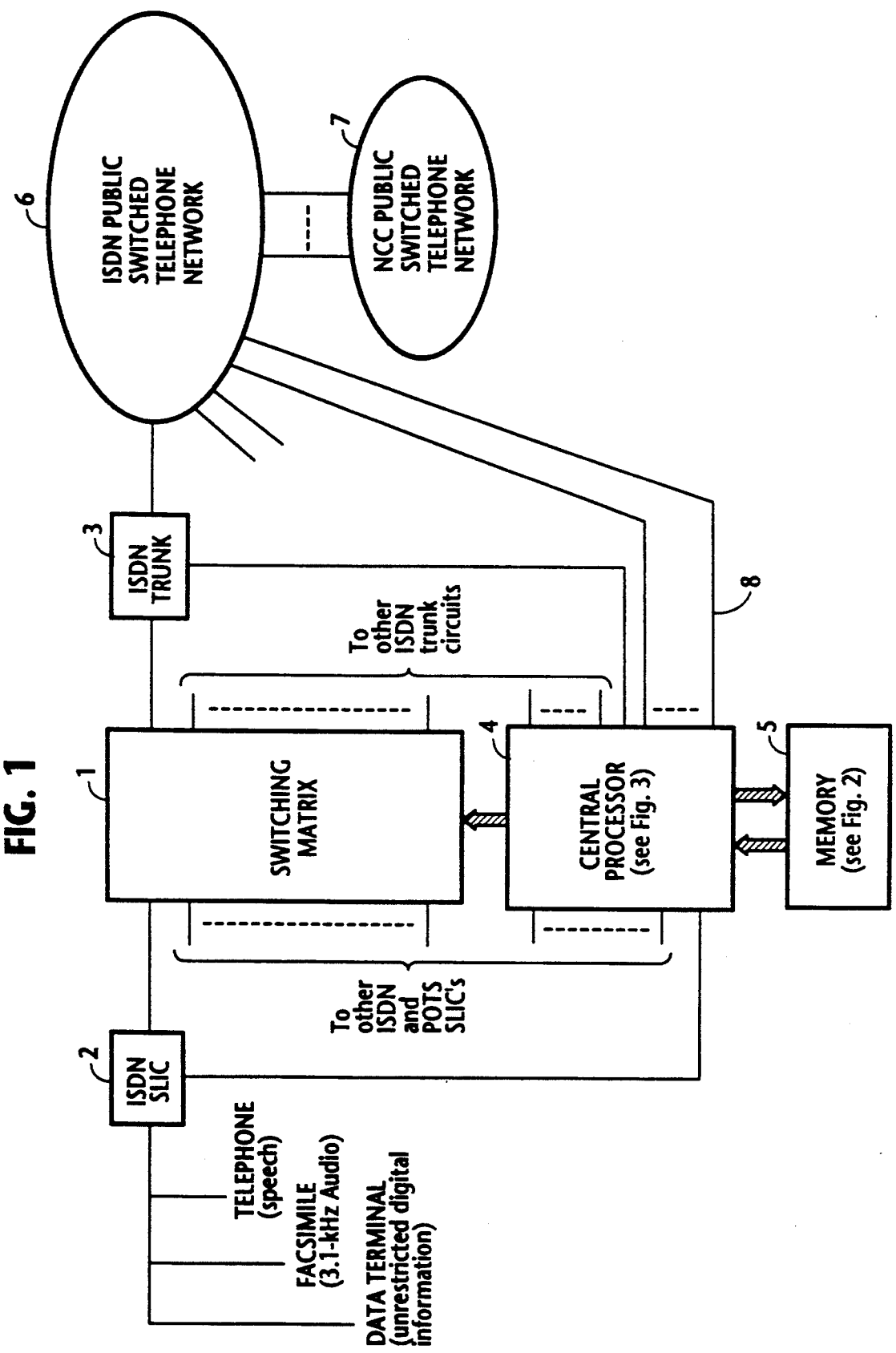
FIG. 1 is a schematic block diagram of a telephone switching system connected through an ISDN network to a new common carrier network.

In FIG. 1, there is shown a telephone switching system according to the present invention. The switching system comprises a switching matrix 1 having on its left side line terminals coupled to ISDN subscriber line interface circuits 2 as well as to POTS (plain old telephone service) subscriber line interface circuits, and on its right side trunk terminals coupled to ISDN trunk circuits 3. Switched connections are set up in the matrix 1 in response to a control signal supplied from a central processor 4. To accomplish this, central processor 4 is connected to all line circuits 2 and all trunk circuits 3 to receive various call processing signals including call setup messages, and is associated with a main memory 5 in which call handling programs are stored. The switching system is connected to an ISDN public switched telephone network 6 through ISDN trunk circuits 3, and routes to destinations extend further via the ISDN network 6 to a new common carrier (NCC) public switched telephone network 7. Central processor 4 is further connected through signaling channels 8 to a common channel signaling system of the ISDN network 6.

The subscriber may use a variety of customer premises equipment (CPE) such as an ISDN telephone, a facsimile and a data terminal, for example, which are connected on a bus system through an ISDN interface (CCITT Recommendation Q. 931) to the subscriber line. The signals transmitted from the telephone, facsimile and data terminal are classified as speech, 3.1-kHz audio and unrestricted digital information (UDI) signals, respectively, by the CCITT recommendations and specified according to ISDN protocols by the 5-bit information transfer capability field of the bearer capability information element contained in the call setup message.

Figure 2:
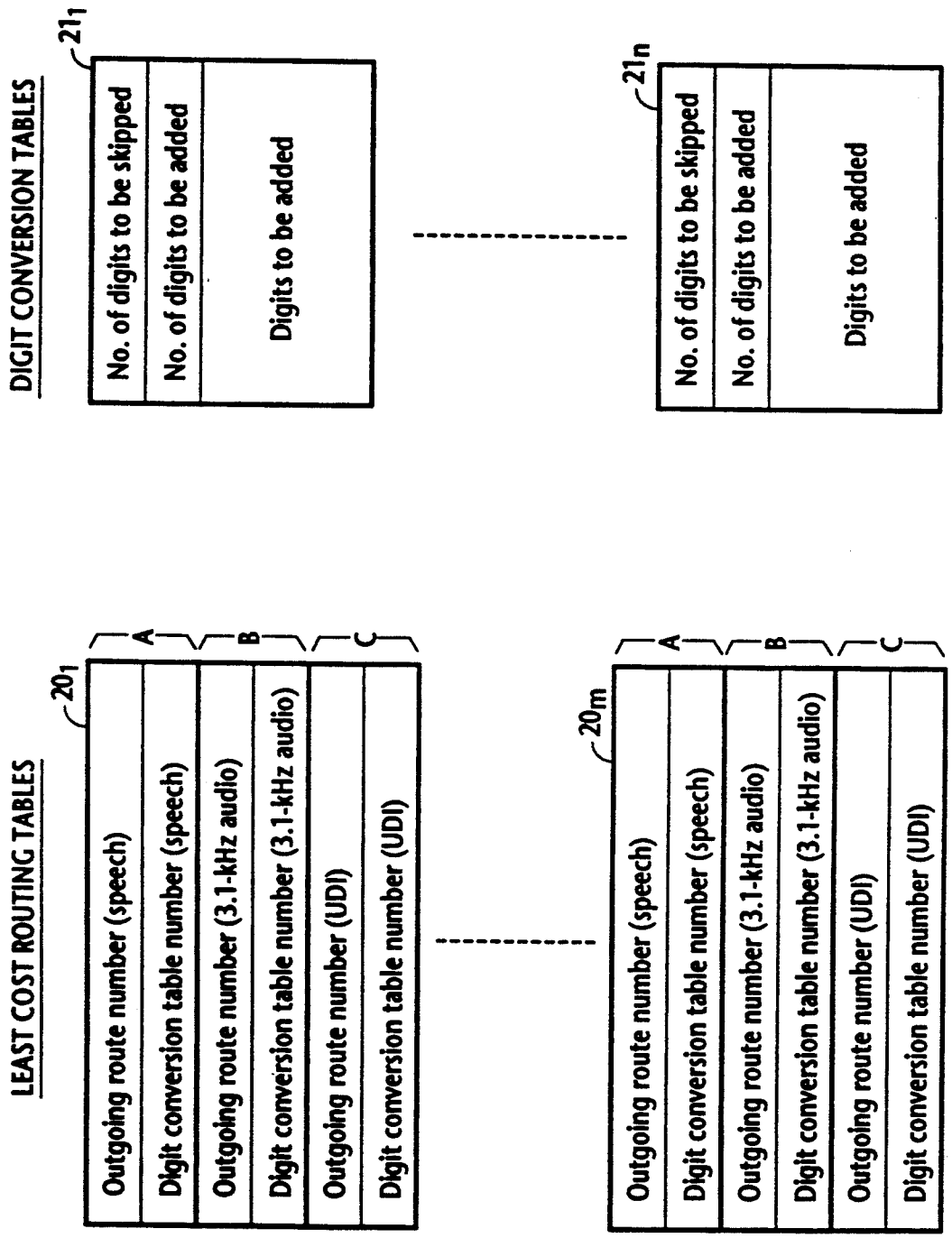
FIG. 2 is a view showing details of the memory of FIG. 1 necessary for establishing a least cost route.

As shown in FIG. 2, memory 5 includes a plurality of least cost routing tables $20_1 \sim 20_m$ as well as the normal call handling programs. Each least cost routing table is divided into three areas A, B and C corresponding respectively to speech, 3.1-kHz audio and UDI information transfer capabilities, and each of these areas is further divided into two subareas for storing an outgoing route number and a digit conversion table number, respectively.

As will be described, one of the least cost routing tables 20 is selected by central processor 4 according to the called party number contained in a received call setup message, and data contained in two subareas of the selected table are read out according to the information element contained in the received call setup message.

Memory 5 further includes a plurality of digit conversion tables $21_1 \sim 21_n$ which are selected by the central processor according to the digit conversion table number read out of a selected least cost routing table.

A program shown in FIG. 3 is the functions the central processor 4 is to perform in response to receipt of a call setup message. The execution of the program starts with step 30 which checks to see if a call setup message is received from a subscriber's CPE through one of the ISDN subscriber line interface circuits 2. If so, it proceeds to step 31 to check to see if it contains a called party number and a 5-bit information transfer capability field. If the answer is affirmative, exit is to step 32 to disassemble the received call setup message, and examines the header portion of the called party number using a known digit analyzer. If the digit analysis reveals that the call is destined to the NCC network 7, control selects one of the least cost routing tables 20 which is appropriate for the outgoing call. Exit then is to step 33 to read an outgoing route number and a digit conversion table number from the selected least cost routing table 20 using the information transfer capability information element. Control proceeds to step 34 to select one of the digit conversion tables 21 identified by the digit conversion table number just read out of the selected least cost routing table and fetch data therefrom. If negative decision is made in step 31, control branches to step 38 to send a disconnect message to the originating subscriber.

Exit then is to step 35 to convert the called party number of the disassembled call setup message according to the fetched data. As shown in FIG. 2, each of the digit conversion tables 21 contains data indicating the number of digits to be skipped from the beginning of the called party number, data indicating the number of digits to be added to the called party number, and data indicating the digits to be added. The digit conversion is achieved by inserting the digits fetched from the "digits-to-be-added" area of the selected digit conversion table to the skipped portion of the called party number.

Control exits to step 36 to transmit an acknowledgment message to the originating subscriber, signaling receipt of a valid call setup message.

Exit then is to step 37 to assemble the call setup message with the converted called party number, selects an ISDN trunk circuit 3 according to the route number read out of the selected LCR table 20 and controls the switching matrix 1 to establish a connection between the originating ISDN subscriber line interface circuit 2 and the selected ISDN trunk circuit 3, and transmits the assembled call setup message through one of the signaling channels 8 to the common channel signaling system of ISDN network 6.

In this way, the originating subscriber is connected to an outgoing ISDN trunk circuit that is specified by the outgoing route number fetched from the selected least cost routing table, and the call setup message is directed to ISDN network 6 where the converted called party number is used to switch the call through NCC network 7 to a desired destination.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A switching system comprising:
   a plurality of ISDN (Integrated Services Digital Network) subscriber line interface circuits each being capable of serving a plurality of customer premises equipment (CPE) of different information transfer capabilities, each of the CPE transmitting a call setup message including, a called party number and an information transfer capability field identifying the CPE when originating a call;
   a plurality of ISDN trunk circuits connected to an ISDN network;
   switching means for establishing a switched connection between one of the ISDN subscriber line interface circuits and one of said ISDN trunk circuits;
   memory means for storing least cost routing data indicating least cost outgoing routes through said ISDN network and digit conversion data corresponding to said least cost outgoing routes; and
   control means for receiving a call setup message from an originating CPE through one of the ISDN subscriber line interface circuits, retrieving least cost routing data and digit conversion data from said memory means according to the called party number and information transfer capability field contained in the received call setup message, converting said called party number according to the retrieved digit conversion data, selecting one of said ISDN trunk circuits according to the retrieved least cost routing data, controlling said switching means so that a switched connection is established between said one ISDN subscriber line interface circuit and said selected ISDN trunk circuit, and transmitting the converted called party number through a signaling channel to the ISDN network.

2. A switching system as claimed in claim 1, wherein said least cost routing data is stored in a plurality of least cost routing tables, and the digit conversion data is stored in a plurality of digit conversion tables, each of the least cost routing tables storing a plurality of least cost route numbers identifying possible least cost routes and digit conversion table numbers identifying said digit conversion table numbers identifying said digit conversion tables, and wherein said control means includes:
   means for analyzing digits of the called party number of the received call setup message;
   means for selecting one of said least cost routing tables in accordance with the analyzed digits and retrieving one of the least cost route numbers and one of the digit conversion table numbers from the selected least cost routing table in accordance with the information transfer capability field of the received cell setup message;
   means for fetching digit conversion data from one of said digit conversion tables which is identified by the retrieved digit conversion table number for converting said called party number with the fetched data; and
   means for selecting one of the ISDN trunk circuits according to the retrieved least cost route number.

3. In a switching system comprising a plurality of ISDN (Integrated Services Digital Network) subscriber line interface circuits each being capable of serving a plurality of customer premises equipment (CPE) of different information transfer capabilities, each of said CPE transmitting a call setup message including a called party number and an information transfer capability field identifying the CPE when originating a call, and a plurality of ISDN trunk circuits connected to an ISDN network, a method for establishing a least cost route comprising the steps of:

a) storing least cost routing data indicating least cost outgoing routes through said ISDN network and digit conversion data corresponding to said least cost outgoing routes in a memory;

b) receiving a call setup message from an originating CPE through one of the ISDN subscriber line interface circuits;

c) retrieving least cost routing data and digit conversion data from said memory according to the called party number and information transfer capability field contained in the received call setup message;

d) converting said called party number according to the retrieved digit conversion data;

e) selecting one of said ISDN trunk circuits according to the retrieved least cost routing data;

f) establishing a connection between said one ISDN subscriber line interface circuit and said selected ISDN trunk circuit; and g) transmitting the converted called party number through a signalling channel to the ISDN network.

* * * * *